United States Patent [19]

Kohno et al.

[11] Patent Number: 5,012,359
[45] Date of Patent: Apr. 30, 1991

[54] MAGNETIC DISK APPARATUS

[75] Inventors: Takashi Kohno; Osami Matsushita, both of Ibaraki; Michiaki Ida; Katsuaki Kikuchi, both of Tsuchiura; Taro Sonoda, Ibaraki; Yuzo Yamaguchi, Tsuchiura, all of Japan

[73] Assignee: Hitachi, Ltd., Tokyo, Japan

[21] Appl. No.: 446,281

[22] Filed: Dec. 5, 1989

[30] Foreign Application Priority Data

Dec. 14, 1988 [JP] Japan ................... 63-313871

[51] Int. Cl.⁵ ..................... G11B 17/02; G11B 17/32
[52] U.S. Cl. .................................. 360/71; 360/98.07; 360/99.04; 360/99.08
[58] Field of Search ............... 360/98.07, 99.04, 99.08, 360/71

[56] References Cited

U.S. PATENT DOCUMENTS 4,488,193 12/1984 Davis et al. .................. 360/98.07
4,656,545 4/1987 Kakuta ......................... 360/98.07
4,677,509 6/1987 Nishida et al. ................ 360/98.07

Primary Examiner—Robert S. Tupper
Attorney, Agent, or Firm—Antonelli, Terry, Stout & Kraus

[57] ABSTRACT

This invention relates to a magnetic disk apparatus equipped with magnetic bearings for supporting a spindle without contact by a magnetic attracting or repulsing force. The magnetic disk apparatus prevents occurrence of oscillation of magnetic disks and accomplishes high accuracy positioning.

9 Claims, 4 Drawing Sheets

MAGNETIC DISK APPARATUS

BACKGROUND OF THE INVENTION

1. Field of the Invention

This invention relates to a method of supporting a rotary portion in a magnetic disk apparatus.

2. Description of the Prior Art

In a conventional magnetic disk apparatus, a plurality of magnetic disks are fitted to a spindle in a lamination state and the spindle is supported by ball bearings at two positions. A motor is formed of a rotor of a permanent magnet disposed at one end of the spindle and a stator core disposed on a housing and is driven at a predetermined number of rotation. A magnetic fluid seal is provided between the ball bearings and the magnetic disk to prevent contamination of the magnetic disk by lubricating oil of the ball bearings. Balancers are fitted to both ends of the spindle to correct any imbalance of the rotary portion.

Incidentally, apparatuses of this kind are disclosed in Japanese Patent Laid-Open Nos. 137765/1987 and 239466/1987.

The prior art described above uses the ball bearings to support a rotating member. Ball bearings having extremely high accuracy are required for the magnetic disk. In the case of the ball bearings, damages or scratches of an outer or inner race, non-uniformity of each ball and eccentricity of a rolling surface are unavoidable and oscillation occurs with these factors as an exciting force. If the natural frequency of the rotation system resonates with this exciting force or its n-times component, great oscillation occurs in the rotation system and contact between the magnetic disk and a slider equipped with a magnetic head is impeded, causing abnormality in recording and reproduction of information.

When the information on the magnetic disk is read or recorded at the timing of seeking, a head assembly does a seeking operation in a track direction and at this time, secondary bending oscillation of the shaft system is excited by seek reaction, causing oscillation and track error.

SUMMARY OF THE INVENTION

It is an object of the present invention to provide a magnetic disk apparatus which can prevent the occurrence of oscillation of magnetic disks and can make positioning highly accurately.

In a magnetic disk apparatus including a plurality of magnetic disks that are laminated, a spindle for the magnetic disks and bearings for supporting the spindle, the present invention is characterized in that the bearings described above are magnetic bearings for supporting the spindle without contact by magnetic attracting or repulsing force.

Such spindle and magnetic bearings are supported only by electromagnetic attracting force and the spindle rotates in non-contact state. Accordingly, exciting force that can be observed in the case of ball bearings does not occur due to rotation and stable characteristics can be obtained even when high speed rotation is effected.

DESCRIPTION OF THE ILLUSTRATED EMBODIMENTS

Figure 1:
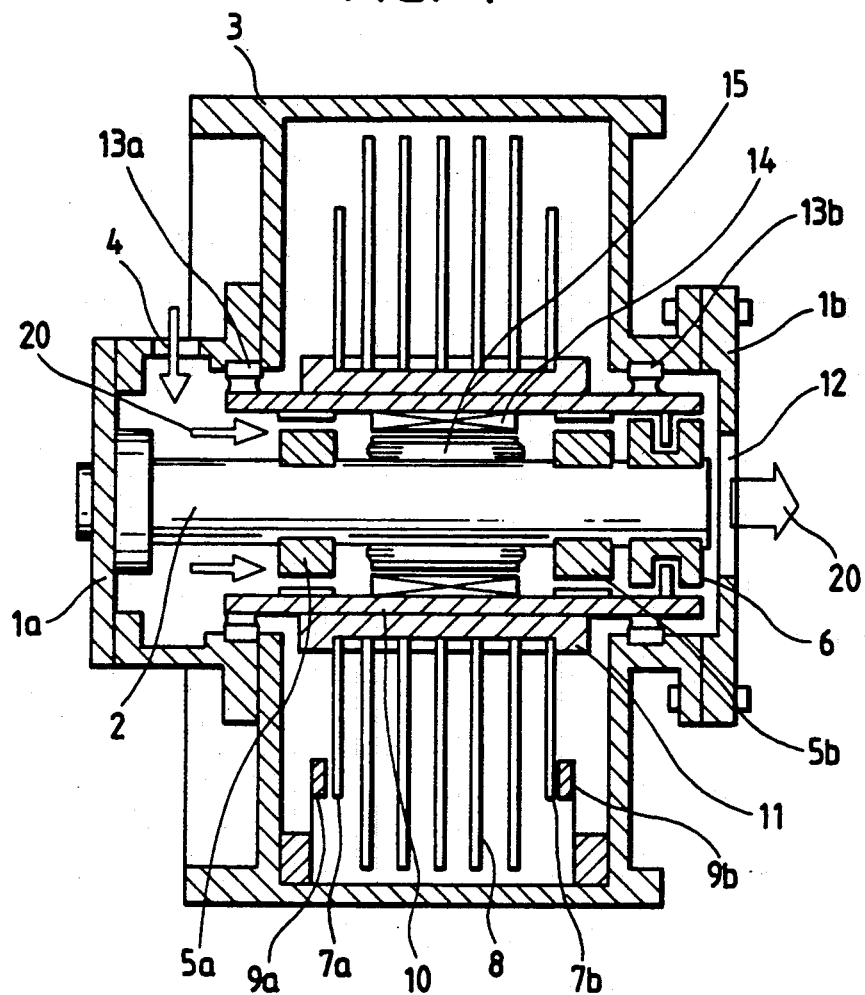
FIG. 1 is a longitudinal sectional view showing an embodiment, of the present invention.

FIG. 1 shows a first embodiment of the present invention. A plurality of magnetic disks 8 are fitted to a hollow cylindrical spindle 10. The two outermost disks 7a, 7b of the magnetic disks 8 are disks for seek control, and servo tracks for seek control are written on these disks. Oscillation or inclination of the magnetic disk 8 is detected by reading this control track by a shroud 3 or by control heads 9a, 9b for controlling an electromagnetic bearing that are fixed to a base of a head seek mechanism (not shown) so as to control the magnetic bearings 5, 6. Reference numerals 5a and 5b represent magnetic bearings for controlling a radial direction and reference numeral 6 represents a magnetic bearing for controlling a thrust direction. The radial electromagnetic bearings 5a, 5b and the thrust electromagnetic bearing 6 are all fixed to a stator 2 and are installed in the hollow spindle 10. Reference numeral 14 represents a stator coil of a motor, which constitutes the motor together with a magnet 14 provided on the spindle 10, and rotates the spindle 10 at a predetermined number of rotation. The stator 2 is fixed to the housing 1, which is coupled to the shroud 3. In this manner, the rotation system consisting of the magnetic disks 8, a hub 11 and the spindle 10 is supported without contact and rotates at a high speed around the stator 2. Both the magnetic bearings 5, 6 and motor coil 15 radiate heat. If any thermal deformation occurs in the magnetic disks due to this heat radiation, it results in track errors, and the like. In this embodiment, the magnetic bearings are inferior to a conventional bearing type because of the heat radiation. The quantity of heat radiated from the motor increases if high speed rotation is effected. In this embodiment, an inlet port 4 for cooling medium is disposed in the shroud 3 and the cooling medium 20 is forcedly caused to flow into the hollow spindle. The cooling medium 20 cools efficiently and sequentially the radial bearing 5a, the motor 15, the radial bearing 5b and the thrust bearing 6 and flows out from an outlet port 20. A seal 13 is disposed lest any dust contained in the cooling medium 20 flows to the disk 8 side.

Since the leakage fluxes from the magnetic bearings 5, 6, the motor coil 15 and the magnet 14 are shielded by the hub 11 and the hollow spindle 10, they do not affect the magnetic disks 8. The shielding effect can be improved by use of a material having a higher shield property for the hub 11 and the spindle 10.

In the case of the magnetic bearing, the rotor is floated and supported without contact. To keep this floating, feedback control is always carried out. Therefore, influences of disturbance can be reduced. If the spindle consists of the hollow cylindrical shaft and the magnetic bearings are disposed inside the spindle, as in the present invention, the existence of the leakage flux can be presented without disposing any shield between the magnetic disks and the magnetic bearing.

In the magnetic disk of the present invention, a current must be kept flowing through the electromagnet in order that the magnetic bearing keeps the rotor always floated, and heat is thereby radiated in the coil. However, the cooling effect can be improved by use of the hollow cylinder for the spindle and by causing the cooling fluid to flow through the spindle.

When the spindle is supported by the ball bearings, lubricating oil is necessary and this oil scatters with rotation and contaminates the magnetic disks. Since no lubricating oil is necessary for the magnetic bearing, such a problem does not arises.

Figure 2:
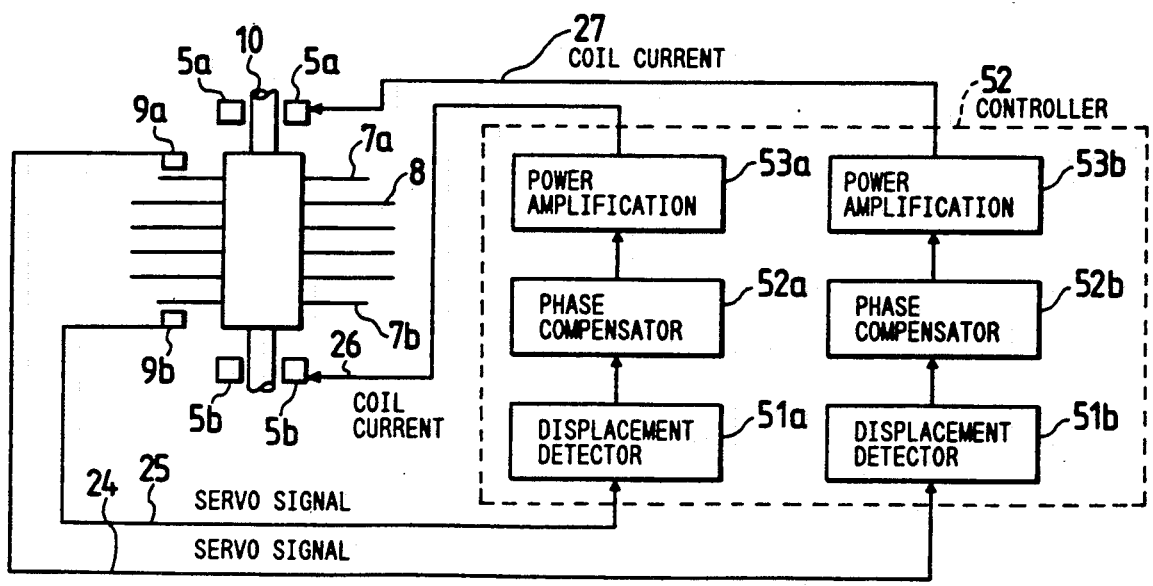
FIG. 2 is a system block diagram showing a control system of the present invention.

FIG. 2 shows a system diagram of the control system of the present invention. The control disks 7a and 7b are disposed on both sides of the magnetic disks 8 on which the information is recorded. Servo signals for position control, that are recorded on the control disks 7a and 7b, are detected by control position read heads 9a and 9b. The distance of displacement from a neutral position can be determined from the servo signals 24, 25 by displacement detectors 51a, 51b, respectively. Driving currents 27, 26 suitable for the radial electromagnetic bearings 5a, 5b to control the spindle 10 to the neutral position are outputted by phase compensators 52a, 52b and power amplification circuits 53a, 53b based on these displacement signals, respectively.

Figure 3:
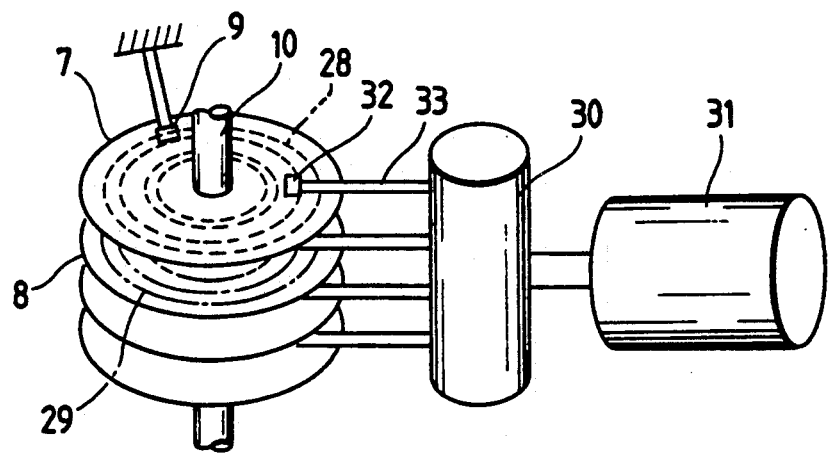
FIG. 3 is an explanatory view explaining a track servo of the present invention.

FIG. 3 is an explanatory view of a servo system of the present invention. Track servo signals for seek control that are in advance written on the magnetic disks 7 are read by the fixed heads 9 and oscillation of the disks is detected from the read information so as to make control.

When the heads make the seeking operation in the radial direction between the tracks in the magnetic disk apparatus, the control disk 7, such as shown in FIG. 3, to which the servo signal 28 for track control is written, is disposed in order to accurately catch each track. A control track 28 is written on the control disk 7 in such a manner as to correspond to each information track 29. Each track can be accurately caught by detecting the signal from this control track 28 with the control head 32 and making a corresponding control by a voice coil motor 31. This method has already been used practically as a data plane servo system. In the present invention, this control track is read by the fixed head 9 to detect displacement of the magnetic disk 8 and to control the spindle itself by the magnetic bearings.

Figure 4:
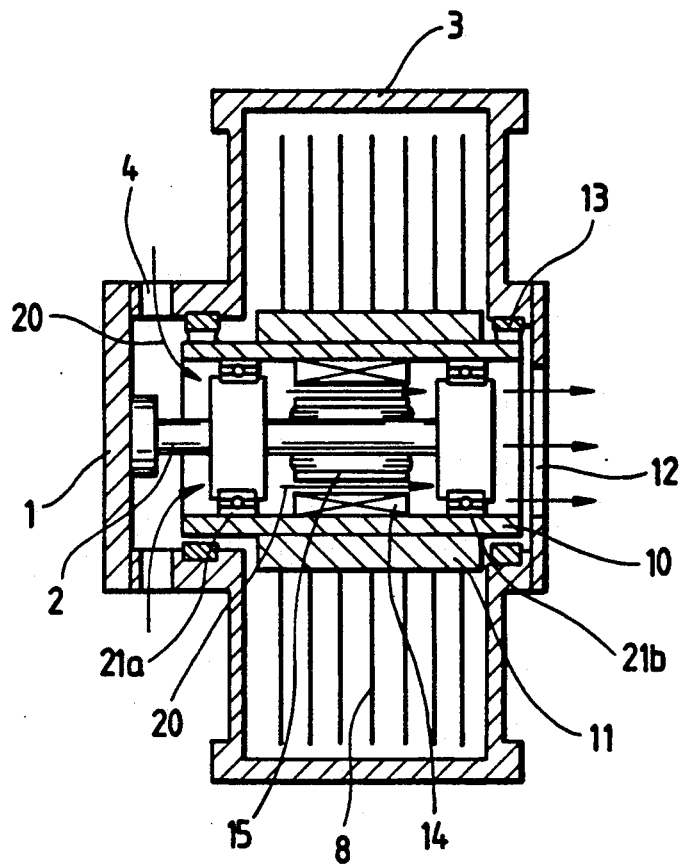
FIGS. 4 and 5 are longitudinal sectional views showing other embodiments of the present invention.

Still another embodiment of the present invention is shown in FIG. 4.

This embodiment uses ball bearings 21a, 21b in place of the magnetic bearings. In this case, too, the natural frequency of the shaft can be increased by shaping the spindle 10 into the hollow cylindrical shape, and resonance with the exciting force due to the passage of balls can be avoided.

Heat radiated from the stator coil 15 can be removed effectively by causing the cooling medium 20 to flow through the hollow spindle 10, and the drop of reliability due to thermal deformation can be avoided. Similar effects can be obtained by use of radiation fins in place of causing the cooling fluid to flow.

Figure 5:
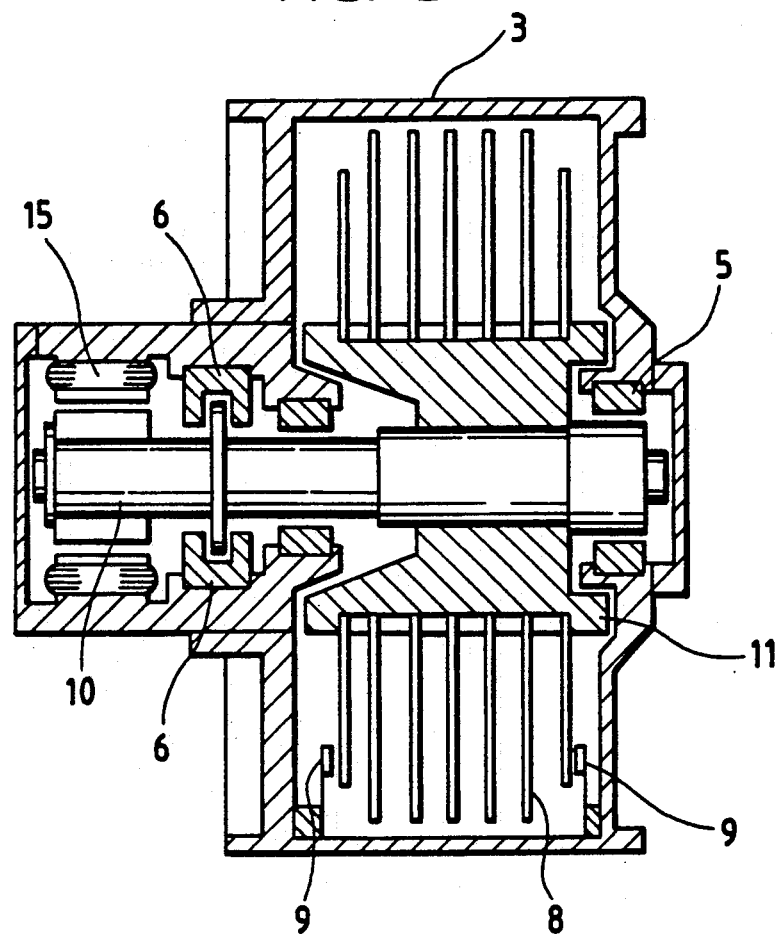

FIG. 5 shows still another embodiment of the present invention.

This embodiment applies directly the magnetic bearings 5, 6 to a conventional magnetic disk apparatus and is characterized in that it can eliminate the exciting force due to the passage of balls and does not need oil seal.

Figure 6:
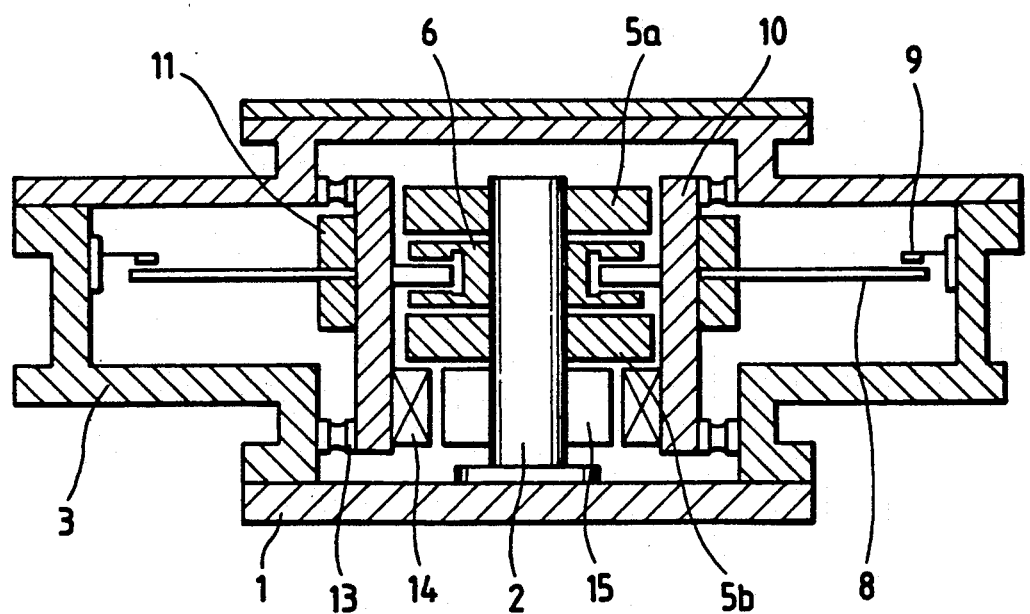
FIG. 6 is a longitudinal sectional view showing still another embodiment of the present invention.

FIG. 6 shows still another embodiment of the present invention, and the control track for controlling the magnetic bearings is disposed on the outermost periphery of the data disk plane. As shown in the drawing, this embodiment is applied to a type which has no servo disk separately.

Figure 7:
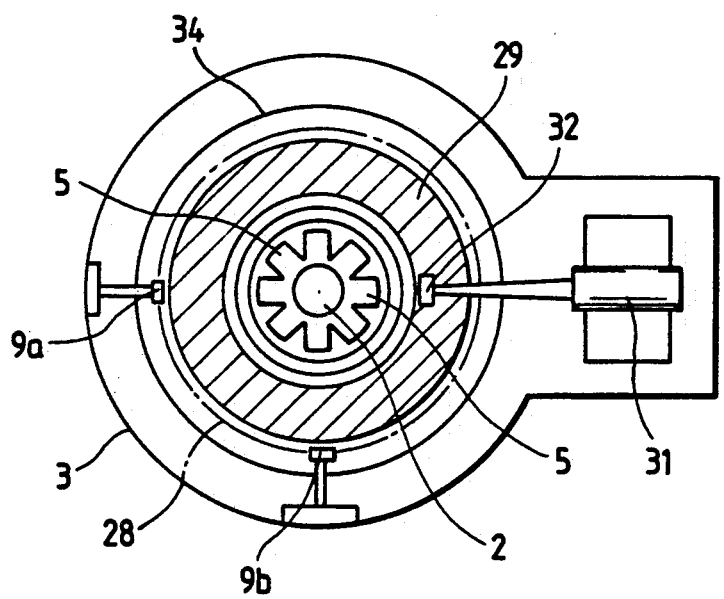
FIG. 7 is a plan view of the magnetic disk apparatus shown in FIG. 6.

FIG. 7 is a top view when the apparatus shown in FIG. 6 is viewed from immediately above. Two control heads are disposed at positions deviated from each other by 90 degrees. If the rotation system is considered as a rigid body, vertical motion along the axis of rotation, parallel motion in the horizontal direction and precession motion in a inclination direction of the axis of rotation can be considered as the oscillation modes. Each mode can be separated from one another by fitting a plurality of sensors as in this embodiment and comparing the phase and amplitude of the signal from each sensor. Each of the radial and thrust bearings is controlled from them.

In this case, it is possible to employ the no-contact-type to detect the displacement in the thrust direction in the same way as in the prior art, though not shown in the drawing, and to use the signal from the servo track in accordance with the present invention for only in the radial direction.

The servo signals 35a, 35b in the X and Y directions from the magnetic heads 9a, 9b are applied to X and Y direction controllers 37a, 37b, respectively, so as to make control of radial electromagnetic bearings in the X and Y directions. The control system of the controllers 37a, 37b is the same as the system shown in FIG. 2.

Displacement in the thrust direction can be determined by comparing the servo signals 35a and 35b. The thrust electromagnetic bearing 6 is controlled by the thrust direction controller 38 from this thrust displacement.

Figure 8:
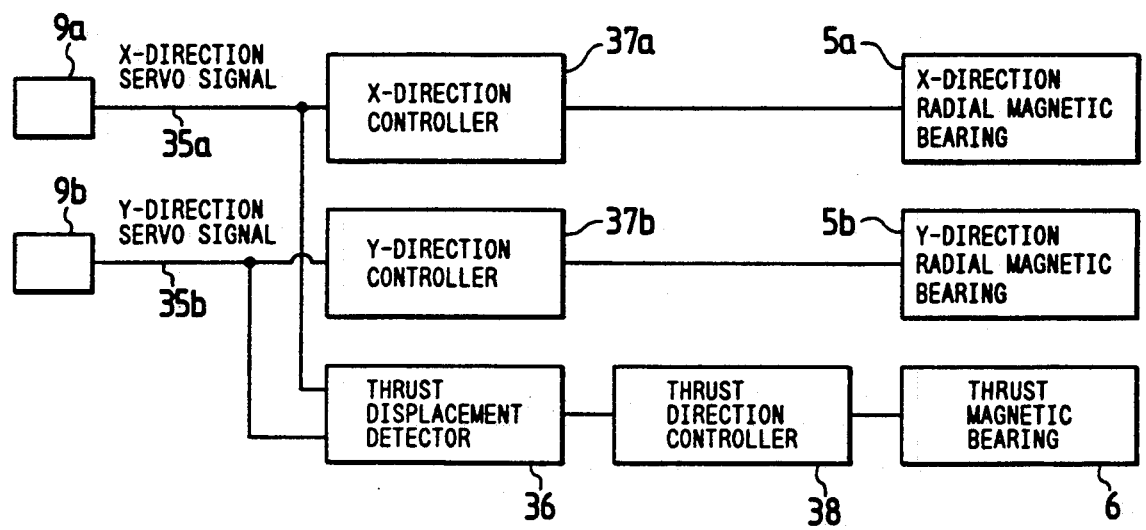
FIG. 8 is a block diagram of a control method shown in FIG. 7.

FIG. 8 shows a block diagram of the controlling method illustrated in FIG. 7. According to the embodiments of the present invention described above, the bearing are converted to the magnetic bearings and the rotation member rotates without contact. Accordingly, oscillation due to the passage of balls, that occurs in the ball bearings, does not occur and rotation can be made at a high speed and stably. Since the lubricating oil is not required, any oil seal is not required, either.

Since control of the magnetic bearings is made by the control signals on the disk, the head can follow up accurately the tracks of the magnetic disk and reliability can be improved.

Since the spindle is a hollow cylinder, the frequency of the rotation system can be increased and the risk of resonance can be avoided.

The motor and the magnetic bearings are disposed inside the hollow cylinder and the cooling medium is caused to flow through the hollow cylinder. In consequence, heat from the motor and from the magnetic bearing can be removed efficiently. Since the motor and the magnetic bearings are installed in the hollow cylinder, the leakage flux from them is shielded by the cylinder and the hub and does not affect the information on the magnetic disk.

Furthermore, since the spindle is the hollow cylinder and the motor and the magnetic bearings are disposed in the cylinder, the length of the apparatus in the axial direction can be reduced as a whole and the apparatus can be made compact.

The present invention can accomplish high precision positioning which lets the heads follow accurately the tracks of the magnetic disks.

What is claimed is:

1. In a magnetic disk apparatus equipped with a plurality of magnetic disks that are laminated, a spindle for said magnetic disks and bearings for supporting said spindle, the improvement characterized in that said bearings are magnetic bearings for supporting said spindle without contact by magnetic attracting or repulsing force.

2. A magnetic disk apparatus according to claim 1, characterized in that said magnetic bearings are bearings for supporting said spindle in a circumferential direction.

3. A magnetic disk apparatus according to claim 1, characterized in that said magnetic bearings are bearings for supporting said spindle in circumferential and axial directions.

4. A magnetic disk apparatus characterized in that said apparatus comprising:

magnetic disks;

magnetic heads for recording information on said magnetic disks and reproducing said information from the same;

a spindle for said magnetic disks;

magnetic bearings for supporting said spindle by a magnetic attracting or repulsing force;

control disks to which track servo signals for controlling said magnetic disks are in advance recoreded;

control heads for reading said servo signals; and control means for detecting displacement of said magnetic disks based on said servo signals by said control heads and controlling said magnetic bearings so as to keep the gaps between said magnetic disks and said magnetic heads constant on the basis of the detected displacement.

5. A magnetic disk apparatus characterized in that said apparatus comprises:

magnetic disks on which track servo signals for control are partly recorded in advance;

magnetic heads for recording information on said magnetic disks and reproducing said information from the same;

a spindle for said magnetic disks;

magnetic bearings for supporting said spindle by a magnetic attracting or repulsing force;

control heads for reading said servo signals; and control means for detecting displacement of said magnetic disks by said control heads and controlling said magnetic bearings so as to keep the gaps between said magnetic disks and said magnetic heads constant on the basis of the detected displacement.

6. In a magnetic disk apparatus including magnetic disks, a spindle for said magnetic disks and bearings for supporting said spindle, the improvement characterized in that said bearings are magnetic bearings for supporting said spindle without contact by a magnetic attracting or repulsing force, said spindle is composed of a hollow cylinder and said magnetic bearings are disposed inside said cylinder.

7. A magnetic disk apparatus according to claim 6, characterized in that a motor for rotating said magnetic disks is disposed inside said hollow cylinder of said spindle.

8. A magnetic disk apparatus according to claim 6, characterized in that cooling fluid is caused to flow inside said hollow cylinder of said spindle.

9. A magnetic disk apparatus according to claim 6, characterized in that heat radiating fins are disposed inside said hollow cylinder of said spindle.

* * * * *